United States Patent
Hanada et al.

(10) Patent No.: US 8,173,185 B2
(45) Date of Patent: May 8, 2012

(54) FERMENTED SOY SAUCE WITH LESS SOY SAUCE FLAVOR AND PROCESS FOR PRODUCING THE SAME

(75) Inventors: Yoichi Hanada, Noda (JP); Ryohei Tsuji, Noda (JP); Hisanobu Hayashi, Noda (JP); Takayuki Kawazoe, Noda (JP)

(73) Assignee: Kikkoman Corporation, Noda-shi (JP)

( * ) Notice: Subject to any disclaimer, the term of this patent is extended or adjusted under 35 U.S.C. 154(b) by 746 days.

(21) Appl. No.: 12/064,279

(22) PCT Filed: Mar. 31, 2006

(86) PCT No.: PCT/JP2006/306866
§ 371 (c)(1),
(2), (4) Date: Feb. 20, 2008

(87) PCT Pub. No.: WO2007/116474
PCT Pub. Date: Oct. 18, 2007

(65) Prior Publication Data
US 2009/0098246 A1    Apr. 16, 2009

(51) Int. Cl.
*A23L 1/238* (2006.01)
(52) U.S. Cl. .......................................... 426/46; 426/589
(58) Field of Classification Search ................. 426/46, 426/589
See application file for complete search history.

(56) References Cited

U.S. PATENT DOCUMENTS 4,382,964 A    5/1983 Noda et al.

FOREIGN PATENT DOCUMENTS

| EP | 1 142 491 A2 | 10/2001 |
| EP | 1 142 491 A3 | 10/2001 |
| EP | 1 491 098 A1 | 12/2004 |
| JP | 5 115261 | 5/1993 |
| JP | 11 089537 | 4/1999 |
| JP | 2005 245433 | 9/2005 |

OTHER PUBLICATIONS

Sasaki, M. et al. 1991. Biosynthesis of HEMF by yeasts. J. Agric. Fd. Chem. 39: 934-938.*
Hecquet, L. et al. 1996. Biosynthesis of 4-Hydorxy-2,5-dimethyl-3(2H)-furanone by Zygosaccharomyces rouxii. J. Agric. Food Chem. 44: 1357-1360.*
Catrinus Van Der Sluis, et al. "Enhancing and accelerating flavour formation by salt-tolerant yeasts in Japanese soy-sauce processes", Trends in Food Science & Technology, vol. 12, No. 9, 2001, XP 004361379, pp. 322-327.
Masaoki Sasaki, et al. "Biosynthesis of 4-Hydroxy-2 (or 5)-ethyl-5 (or 2)-methyl-3 (2h)-furanone by yeasts", Journal of Agriculture & Food Chemistry, vol. 39, No. 5, May 1991, XP 000208697, pp. 934-938.
Yasuo Hayashida, et al. "The influence of mash pre-aging on the development of the flavour-active compound, 4-hydroxy-2 (or 5)-ethyl 5 (or 2)-methyl-3 (2H)-furanone (HEMF), during soy sauce fermentation", International Journal of Food Science and Technology, vol. 32, No. 1, 1997, XP 002583754, pp. 11-14.
Communication under Rule 71(3) EPC issued Mar. 16, 2011, in Europe Patent Application No. 06 730 814.8-1221.

* cited by examiner

*Primary Examiner* — D. Lawrence Tarazano
*Assistant Examiner* — Hamid R Badr
(74) *Attorney, Agent, or Firm* — Oblon, Spivak, McClelland, Maier & Neustadt, L.L.P.

(57) ABSTRACT

It is intended to provide a means for obtaining a novel soy sauce with less soy sauce smell and having a rich flavor although it is a brewed soy sauce. More particularly, it is intended to provide a process for producing such a brewed soy sauce, comprising: preparing a soy sauce koji; preparing a soy sauce moromi by adding an aqueous common salt solution to the soy sauce koji at a ratio of water within 170% to 450% (V/V); fermenting and maturating the soy sauce moromi; adding either a soy sauce koji alone or a combination of a soy sauce koji and an aqueous common salt solution to the soy sauce moromi during the fermentation and maturation; and further fermenting and maturating the soy sauce moromi after the addition thereof.

6 Claims, No Drawings

1

FERMENTED SOY SAUCE WITH LESS SOY SAUCE FLAVOR AND PROCESS FOR PRODUCING THE SAME

TECHNICAL FIELD

The present invention relates to a novel soy sauce with less soy sauce smell and having a rich flavor although it is a brewed soy sauce.

BACKGROUND ART

A soy sauce is one of Japanese traditional condiments, which is obtained through heat denaturation of either soybeans alone or a combination of soybeans and grains such as cereals, moisture adjustment, inoculation and culturing of a koji mold therein to make a soy sauce koji, addition (mixing) of an aqueous common salt solution thereto to make a soy sauce moromi, fermentation and maturation, press-filtration to make a clear liquid, and pasteurisation (sterilzation under heating). In the present invention, a soy sauce obtained in such a manner refers to "brewed soy sauce".

Brewed soy sauce requires a long period of time for the process of fermentation and maturation of 3 to 10 months. During this period, unique color, taste, and flavor are provided due to the action of various enzymes and microorganisms in a soy sauce koji and a soy sauce moromi. In particular, the flavor is known to consist of 300 types or more of components, which are complexly combined with each other to give off a unique savor of soy sauce. A compound known as one of these flavor components, namely 4-hydroxy-2(or 5)ethyl-5(or 2)methyl-3(2H)-furanone (hereunder, referred to as HEMF) is a representative characteristic soy sauce smell contained in brewed soy sauce. A higher content of this component is likely to provide a favorable soy sauce.

Therefore, various methods for increasing HEMF have been so far examined and developed (refer to Patent documents 1 to 3).

However, in recent years, consumer needs have been diversified, and demands for soy sauce having a reduced soy sauce smell have been increasing. To comply with such needs, various methods for reducing the soy sauce smell are examined and developed (refer to Patent documents 4 to 6), which however involve problems in that the manipulation is cumbersome and that the cost is incremented for industrial practice. Moreover, another method is also known in which HEMF serving as a high boiling component of soy sauce is efficiently removed by decompression, absorption, or the like. However, this method involves problems in that HEMF can not be solely and selectively removed, and as a result, the soy sauce quality is notably deteriorated, and that the cost is incremented.

Incidentally, since HEMF is generated and accumulated by soy sauce yeast fermentation, an effective means for avoiding the generation and accumulation of HEMF in a soy sauce moromi is to suppress the growth of the soy sauce yeast. As an extreme example thereof, a technique is also proposed in which a soy sauce moromi is digested at a high temperature for a short time to suppress the yeast fermentation so as to obtain a soy sauce-like seasoning liquid (Non-patent document 1).

However, such types of moromi prepared by the suppression of yeast fermentation and soy sauce yeast non-fermented moromi obtained by the short time and high temperature digestion have drawbacks such as strong smells of raw materials and smells of warmed brew, inferior masking abilities, defective alcohol contents due to almost nonperformance of alcohol generation and accumulation, problematic fungal resistance, and lower utility values as condiments.

Moreover, juice of a soy sauce moromi obtained by the suppression or nonperformance of yeast fermentation is difficult to expect to have a yeast-derived delicate taste, and provides a monotonous savor lacking in feeling of maturity.

Therefore, it is considered that the accomplishment in the suppression of HEMF generation and accumulation without suppressing yeast fermentation would enable to provide a superiorly versatile soy sauce having a matured umami taste of soy sauce remaining as it is, a yeast-derived delicate taste, unnoticeable smells of raw materials, and a solely reduced soy sauce smell.

Incidentally, in the production of a brewed soy sauce, various flavor components contributing to the rich flavor of soy sauce are mainly generated and accumulated by soy sauce yeast, and are also referred to as "brewed flavor". In particular, alcohol-based flavor components such as methionol are highly correlated to the yeast fermentation, and are known to have effects of reducing smells of raw materials such as steam-boiled soybeans and roasted and milled wheat and smells of soy sauce koji, and effects of eliminating (masking) unpleasant smells of various ingredients and seasoning materials, when used as a condiment (Non-patent document 2).

For such reasons, it is considered to greatly contribute to the soy sauce brewing industry if remarkable amounts of brewed flavors such as methionol can be generated and accumulated by soy sauce yeast fermentation, and if, conversely, HEMF serving as a "characteristic flavor" of a brewed soy sauce can be suppressed as much as possible.

However, generally, the contents of methionol and HEMF are linked with each other in a brewed soy sauce. A soy sauce having less HEMF has less methionol, while a soy sauce having a plenty of methionol has a plenty of HEMF. This means that HEMF and methionol are both derived from the fermentation of soy sauce yeast, and it is difficult to reduce HEMF alone while maintaining methionol in the production of a soy sauce with a conventional process for producing a brewed soy sauce.

In a process for producing a brewed soy sauce, a soy sauce moromi subjected to an appropriate yeast fermentation contains about 20 to 150 ppm of HEMF and concurrently contains about 1.0 to 3.0 ppm of methionol per 1.0% (W/V) of total nitrogen (Non-patent document 3).

However, such a brewed soy sauce has a strong soy sauce smell, which is not suitable for the application to processed foods that are desired to have neither soy sauce-like nor soy sauce-derived flavor.

In this way, with a conventional process for producing a brewed soy sauce, it has been considered to be absolutely impossible and has never been carried out to produce a soy sauce having reduced HEMF while maintaining methionol.

Meanwhile, as a soy sauce having no HEMF, an amino acid soy sauce obtained through degradation of defatted soybeans with hydrochloric acid, neutralization with alkali, and subsequent press-filtration is known. However, this soy sauce has a peculiar amino acid smell in accordance with the degradation with hydrochloric acid, and does not contain HEMF nor methionol due to the nonperformance of yeast fermentation. Accordingly, such an amino acid soy sauce has a common purpose with the present invention in the point of not having HEMF, however it is different from the soy sauce of the present invention in the point of not having methionol. Thus, these two types of sauces are clearly distinguished.

Patent document 1: JP Patent Publication (Kokai) No. 3-183490 A (1991)

Patent document 2: JP Patent Publication (Kokai) No. 5-176781 A (1993)

Patent document 3: JP Patent Publication (Kokai) No. 6-277083 A (1994)
Patent document 4: JP Patent Publication (Kokai) No. 5-115261 A (1993)
Patent document 5: JP Patent Publication (Kokai) No. 9-271351 A (1997)
Patent document 6: JP Patent Publication (Kokai) No. 2004-141014
Non-patent document 1: Soy sauce library First series, written by Ichiro NAGASE, issued on Jun. 1, 1967, p. 29
Non-patent document 2: Numazu Industrial Research Institute of Shizuoka Prefecture Report No. 8, November, 2000, "Development of novel seasoning using microorganisms"
Non-patent document 3: "Science and technology of soy sauce, Enlarged edition", written and edited by Shinrokuro TOCHIKURA, enlarged on Mar. 31, 1994, p. 285

DISCLOSURE OF THE INVENTION

It is an objective of the present invention to obtain a novel soy sauce with less soy sauce smell and having a rich flavor although it is a brewed soy sauce.

The inventors of the present invention have conducted intensive studies to solve the above problems. As a result, they have found that, in the process of producing a brewed soy sauce through heat denaturation of plant seeds such as either soybeans alone or a combination of soybeans and wheat, moisture adjustment, inoculation and culturing of a koji mold therein to make a soy sauce koji; addition (mixing) of an aqueous common salt solution thereto to make a soy sauce moromi, fermentation and maturation, press-filtration to make a clear liquid, and pasteurisation (sterilzation under heating), a soy sauce with less soy sauce smell and having a rich flavor can be obtained, by setting a ratio of water of the aqueous common salt solution to a remarkably higher value (170% to 450% (V/V)) as compared to that of a conventional process (about 120% (V/V)), adding either a soy sauce koji alone or a combination of a soy sauce koji and an aqueous common salt solution to the soy sauce moromi during the fermentation and maturation, and further fermenting and maturating the moromi. The inventors of the present invention have also found that a brewed soy sauce produced by such a characteristic process contains about 15.0 ppm or less of 4-hydroxy-2(or 5)ethyl-5(or 2)methyl-3(2H)furanone and contains about 2.0 ppm or more of methionol per 1.0% (W/V) of total nitrogen. These findings have led to the completion of the present invention.

A first aspect of the present invention is a process for producing a soy sauce with less soy sauce smell, comprising:
preparing a soy sauce koji;
preparing a soy sauce moromi by adding an aqueous common salt solution to said soy sauce koji at a volume ratio of 170% to 450% (V/V) to the volume of plant seeds (conversion as fresh seeds) used for the preparation of said soy sauce koji;
fermenting and maturating said soy sauce moromi;
adding either a soy sauce koji alone or a combination of a soy sauce koji and an aqueous common salt solution to said soy sauce moromi during the fermentation and maturation; and further fermenting and maturating said soy sauce moromi after the addition thereof.

A second aspect of the present invention is a brewed soy sauce with less soy sauce smell produced by the above process, wherein the soy sauce contains 15.0 ppm or less of 4-hydroxy-2(or 5)ethyl-5(or 2)methyl-3(2H)furanone and contains 2.0 ppm or more of methionol per 1.0% (W/V) of total nitrogen.

In the present invention, the volume ratio of an aqueous common salt solution to the volume of plant seeds (volume conversion as fresh seeds) used for the preparation of a soy sauce koji is referred to as the "ratio of water" of the aqueous common salt solution. For example, assuming that 10 L of aqueous common salt solution was added to 5 L of fresh soybeans+3 L of fresh wheat, that is, 8 L of fresh seeds in total, then the ratio of water would be calculated as: (volume of aqueous common salt solution/volume of fresh seeds)× 100=(10 L/8 L)×100=125% (V/V). In the present invention, the volume of fresh seeds means the "bulk volume" including air-gaps collectively measured by a measuring cylinder or the like.

According to the present invention, a novel soy sauce with less soy sauce smell and having a rich flavor although it is a brewed soy sauce can be obtained. Moreover, a soy sauce having an effect of masking unpleasant smells of various ingredients and seasoning materials, when used as a condiment, can be obtained. Further, a soy sauce with an excellent aftertaste can be obtained. A very light-colored soy sauce can also be obtained although the ratio of water is the same.

BEST MODE FOR CARRYING OUT THE INVENTION

Hereafter, the present invention will be described in detail.

In the present invention, a step during a time from the start of fermentation and maturation of a soy sauce moromi obtained by adding a predetermined amount of aqueous common salt solution to a soy sauce koji until the addition of either a soy sauce koji alone or a combination of a soy sauce koji and an aqueous common salt solution thereto, may be referred to as a "first stage fermenting and maturating step". The soy sauce moromi in the first stage fermenting and maturating step may be referred to as a "first stage moromi".

In the present invention, during the first stage fermenting and maturating step, that is to say, before the fermentation and maturation have been completely finished, either a soy sauce koji alone or a combination of the soy sauce koji and an aqueous common salt solution is added to the first stage moromi. In the embodiment where a soy sauce koji is added to the first stage moromi, the soy sauce koji to be added to the first stage moromi may be specifically referred to as an "additional koji". In the embodiment where a combination of a soy sauce koji and an aqueous common salt solution is added to the first stage moromi, it is preferable that the soy sauce koji and the aqueous common salt solution are previously mixed to make a soy sauce moromi, and are added to the first stage moromi in the form of the soy sauce moromi. In this embodiment, the soy sauce moromi (mixture of the soy sauce koji and the aqueous common salt solution) to be added to the first stage moromi may be specifically referred to as an "additional moromi".

In the present invention, a step of further fermenting and maturating the soy sauce moromi obtained by the addition of the additional koji or the additional moromi to the first stage moromi, may be referred to as a "second stage fermenting and maturating step". The soy sauce moromi in the "second stage fermenting and maturating step" may be referred to as a "second stage moromi".

(Preparation of Soy Sauce Koji)

First, a soy sauce koji is prepared in accordance with a usual process for producing a brewed soy sauce, in the following manner. A steam-boiled and denatured protein raw material such as soybeans and defatted soybeans and a heat-denatured starch raw material such as cereals (wheat, barley, rye, and adlay) and rice, are mixed. The moisture content of the mixture is adjusted to 35% to 50% (W/W). Then, seed koji molds such as *Aspergillus sojae* and *Aspergillus oryzae* are inoculated therein, and cultured at 20° C. to 40° C. for 2 to 4 days.

The heat denaturation of cereals is preferably performed by roasting and milling, while the heat denaturation of rice is preferably performed by steam-boiling or cooking with a rice cooker.

In the present invention, the term "plant seeds" used for the preparation of a soy sauce koji collectively refers to protein raw materials such as soybeans and defatted soybeans, and starch raw materials such as cereals (wheat, barley, rye, and adlay) and rice.

In the present invention, the term "fresh seeds" refers to an intact form of said plant seeds prior to treatments such as drying, heating, milling, and steam-boiling.

The blend ratio of the protein raw material to the starch raw material may be optionally set, although the volume ratio of fresh seeds is preferably set to; protein raw material:starch raw material=50% to 75% (V/V):50% to 25% (V/V).

When defatted soybeans are to be used as a plant protein raw material, the calculation is carried out by assuming that; weight of defatted soybeans (kg)=volume of fresh soybean raw material (L)×0.6. When wheat is to be used as a starch raw material, the calculation is carried out by assuming that; weight of fresh wheat raw material (kg)=volume of fresh wheat raw material (L)×0.75. When other raw materials are to be used, calculation may be carried out in the same manner by assuming a certain weight per unit volume as a coefficient.

(Preparation of Aqueous Common Salt Solution)

The aqueous common salt solution is preferably at a concentration which allows the salt concentration in the matured second stage moromi after the second stage fermenting and maturating step to be 13.0% to 20.0% (W/V), more preferably 14.0% to 18.0% (W/V), and most preferably 15.0% to 17.0% (W/V).

The salt concentration of the above second stage moromi is preferably employed for the salt concentration in the first stage moromi.

It is not preferable if the salt concentration of the first stage moromi and the second stage moromi is less than 13.0% (W/V), since there is a risk of rotting the moromi. Conversely, it is not preferable if the concentration is more than 20.0% (W/V), since the proliferation of yeast is remarkably inhibited.

(Preparation of First Stage Moromi)

The aqueous common salt solution to be added is at the volume which allows the ratio of water to be within 170% to 450% (V/V). That is to say, the aqueous common salt solution is used at 170% to 450% (V/V) with respect to the total volume of the volume (a) of a protein raw material serving as the raw material of soy sauce koji in conversion as fresh seeds, and the volume (b) of a starch raw material similarly serving as the raw material of soy sauce koji in conversion as fresh seeds.

This is very important in the present invention. When the ratio of water is less than 170% (V/V) or more than 450% (V/V), it would be impossible to obtain a brewed soy sauce with less soy sauce smell and having a rich flavor.

(First Stage Fermenting and Maturating Step)

In the first stage fermenting and maturating step, the lactic acid fermentation with a lactic acid bacterium and the yeast fermentation with a yeast are made progress.

(Lactic Acid Fermentation)

The first stage moromi prepared in the above condition is subjected to lactic acid fermentation with or without the addition of a lactic acid bacterium at a temperature of 10° C. to 20° C. This time, in order to prevent the yeast fermentation of soy sauce from preceding, desirably, aeration is avoided as much as possible and the control is carried out at a low temperature of 20° C. or less. The lactic acid fermentation is preferably carried out until 0.5% (W/V) or more of lactic acid is generated in the soy sauce moromi. Such a soy sauce having thus generated and accumulated lactic acid is preferred since it has an excellent savor as a soy sauce.

(Addition of Soy Sauce Yeast)

The soy sauce moromi (pH 5.8 to 6.2) obtained by adding a soy sauce koji to an aqueous common salt solution is gradually dissolved (hydrolyzed) to trigger the elution of raw materials and lactic acid fermentation, which results in a lowering in the pH of moromi to 5.3 to 4.5. Then, the soy sauce moromi would be suitable for the proliferation of yeast.

In order to avoid premature fermentation, the soy sauce yeast is preferably added after the completion of lactic acid fermentation, that is, at the time when the pH of moromi decreases to 5.3 or less.

In the present invention, the soy sauce yeast to be used for the yeast fermentation is preferably a salt tolerant soy sauce yeast which can vigorously grow in a soy sauce moromi having a salt concentration of 10.0% to 20.0% (W/V). Such a soy sauce yeast can be exemplified by *Zygosaccharomyces rouxii*, yeast belonging to the genus *Candida* (*Torulopsis*), *C. etchellsii*, and *C. verstilis*.

In order to accelerate a quick fermentation, preferably yeast is cultured in advance to have an initial cell count of $1 \times 10^5$ to $1 \times 10^7$ cells per 1 g of moromi, before being added to the soy sauce moromi.

(Aerobic Fermentation)

The moromi is preferably kept aerobic in the yeast fermentation. The inventors of the present invention have found that, when the soy sauce moromi whose ratio of water for preparing the first stage moromi has been set to a remarkably higher value (170% to 450% (V/V)) as compared to that of a conventional process is kept aerobic, a yeast vigorously grows, while surprisingly the generation of HEMF can be remarkably suppressed.

In order to keep a moromi aerobic, the moromi is aerated with oxygen, air, or the mixture thereof, alternatively aeration and mechanical agitation (with a propeller-type revolving agitator or a blade-type revolving agitator) are jointly used.

Thus produced soy sauce moromi has a remarkably higher ratio of water as compared to a normal soy sauce moromi. Therefore, the solid content and the moromi viscosity in the soy sauce moromi are decreased as compared to a ratio of water in a soy sauce moromi according to a conventional process (about 120% (V/V)), and thereby the aeration efficiency is improved. As a result, the necessary amount of aeration can be lowered, and thus advantages are provided in which the coloration of moromi and the alcohol splash can be minimized.

Further, since the concentrations of total nitrogen and sugar serving as HEMF forming precursors are low, the HEMF generation amount can be kept less than a determined amount while the yeast proliferation vigorous, which is thus preferable.

(Characteristics of First Stage Moromi)

A soy sauce with less soy sauce smell is given when the product is directly obtained from the first stage moromi on completion of the first stage fermenting and maturating step. However, the total nitrogen concentration is low and no depth of taste is provided. Moreover, since the alcohol concentration is low and there is a risk of contamination with harmful microorganisms, the control of moromi is difficult. Further, the moromi is too soft to squeeze by a usual squeezer and requires a special squeezer. Moreover, since the fermentation is conducted in an aerobic condition, there are problems in that a rich flavor is not provided and a yeast smell emits when matured.

In this way, since the productization at the stage of first stage moromi brings various problems, a preparation of a second stage moromi, that is to say, an addition of a soy sauce koji (additional koji) alone or a combination of a soy sauce koji and an aqueous common salt solution (additional moromi) to the first moromi during the first stage fermenting and maturating step, is required.

(Preparation of Second Stage Moromi)

The purpose of the addition of an additional koji or an additional moromi to the first stage moromi is to make up for the lack of total nitrogen and alcohol in the first stage moromi. It is not necessary to use either a special additional koji or a special soy sauce koji to be used for the preparation of an additional moromi.

The usage amount of the additional koji or the additional moromi can be appropriately determined in accordance with the ratio of water for preparing the first stage moromi. The usage amount of the additional koji or the additional moromi is preferably set so that the total nitrogen concentration of the finally obtained soy sauce product is comparable to that of a normal brewed soy sauce. Thus, the final ratio of water (total ratio of water) is preferably adjusted within a range of 80% to 160% (V/V), more preferably within a range of 100% to 150% (V/V) since the handlings of moromi such as squeezing are facilitated, and particularly and most preferably within a range of 120% to 140% (V/V) since both yield rate and quality are excellent. The term "final ratio of water" or "total ratio of water" refers to a ratio of the total volume of an aqueous common salt solution to the total volume of plant seed materials used for the overall production step of a brewed soy sauce serving as a final product. Specifically, in the embodiment in which an additional koji is added to the first stage moromi, the term "final ratio of water" or "total ratio of water" means a ratio of the volume of an aqueous common salt solution for the preparation of the first stage moromi, to the total volume of the volume of plant seed materials serving as the raw material of the soy sauce koji for the preparation of the first stage moromi (conversion as fresh seeds) and the volume of plant seed materials serving as the raw material of the additional koji (conversion as fresh seeds). Moreover, in the embodiment in which an additional moromi is added to the first stage moromi, the term "final ratio of water" or "total ratio of water" means a ratio of the total volume of the volume of an aqueous common salt solution for the preparation of the first stage moromi and the volume of an aqueous common salt solution for the preparation of the additional moromi, to the total volume of the volume of plant seed materials serving as the raw material of the soy sauce koji for the preparation of the first stage moromi (conversion as fresh seeds) and the volume of plant seed materials serving as the raw material of the soy sauce koji for the preparation of the additional koji (conversion as fresh seeds).

Moreover, the ratio of an additional koji or a soy sauce koji for the preparation of an additional moromi to a soy sauce koji for the preparation of the first stage moromi may be set within 50% to 300% (W/W). This ratio being 50% (W/W) or less is unfavorable, since the total nitrogen concentration in the finally obtained brewed soy sauce is lowered, even in cases where not an additional moromi but an additional koji is added. Conversely, this ratio being more than 300% (W/W) is unfavorable, since the raw materials of the second stage moromi is badly eluted, lowering the utilization rate. This ratio within a range of 50% to 300% (W/W) provides an excellent quality of moromi having an appropriate moromi viscosity without a squeezing-related problem. In particular, this ratio within a range of 100% to 200% (W/W) is preferable, since the quality balance is excellent.

Moreover, the concentration of an aqueous common salt solution used for the preparation of the additional moromi depends on the salt concentration of the first stage moromi and the blend ratio of the aqueous common salt solution to the soy sauce koji used for the preparation of the additional moromi, although it may be a concentration which allows the salt concentration of the soy sauce moromi after the addition of the additional moromi (second stage moromi) to be within 13.0% to 20.0% (W/V).

(Timing for Adding Additional Koji or Additional Moromi)

The timing for adding the additional koji or additional moromi is not strictly defined, although it is preferably added when the first stage moromi has a viable cell count of the yeast reaching $3 \times 10^7$ cells or more, and particularly $5 \times 10^7$ cells or more, per 1 g of first stage moromi. It is unfavorable to add the additional koji or additional moromi in the condition where a viable cell count of the yeast does not reach $3 \times 10^7$ cells per 1 g of first stage moromi, or in the condition where the death phase has come and a viable cell count of the yeast is below to $3 \times 10^7$ cells, because the accumulation rate of the sugar source due to the elution of raw materials goes higher than the assimilation rate of the sugar source by yeast, and thus HEMF is generated. Conversely, it is more preferable if the viable cell count reaches $3 \times 10^7$ cells or more per 1 g of first stage moromi, since the sugar source is assimilated approximately concurrently with the elution, thus no HEMF is generated, and the reducing sugar (RS) in the final moromi can be kept low, thus resulting in light-colored finished product with an excellent gloss stability.

(Measurement of Viable Cell Count of Yeast in Moromi)

The viable cell count of the soy sauce yeast in moromi is measured in the following manner. The following modified medium is prepared by adding chloramphenicol to a medium for measuring salt tolerant yeast cell count (refer to "Experimental Method for Soy Sauce" edited by The Japan Soy Sauce Inspection Institute, issued on Mar. 1, 1985, p. 248), and is then added with a predetermined amount of diluted solution of moromi which has been diluted at a predetermined concentration. After 24-hour culturing at 30° C., the number of colonies of the soy sauce yeast is counted. Based on the measurement results, the soy sauce yeast viable cell count (cells/g of moromi) is obtained.

(Modified Medium)
Composition
glucose: 30 g
casamino acid: 4 g
powder yeast: 2 g
$KH_2PO_4$: 1 g
$MgSO_4.7H_2O$: 0.5 g
$CaCl_2.2H_2O$: 0.1 g
salt: 50 g
chloramphenicol: 0.025 g
agar: 20 g
pH: 4.8
The total volume was adjusted to 1000 ml with water.

(Second Stage Fermenting and Maturating Step)

In the second stage fermenting and maturating step, the moromi after the addition of the additional koji or additional moromi (namely, the second stage moromi) is further fermented and matured. In this step, it is preferable to complete the fermentation and maturation by the action of the yeast and the lactic acid bacterium transferred from the first stage moromi, without the addition of new lactic acid bacterium and yeast. In this step, the elution of the sugar source and the assimilation of the sugar source by the yeast transferred from the first stage moromi are performed in an approximately concurrent manner. That is, alcohol is generated and accumulated without remarkably increasing the sugar concentration in the moromi. As a result, the generation of HEMF can be minimized. Moreover, this fermentation improves the flavor balance of moromi and also improves the microorganismal stability of moromi. Aeration after the addition of the additional moromi is desirably performed in an appropriate manner since vigorous aeration would splash alcohol. The second stage moromi obtained by the addition of the additional koji or the additional moromi during the first stage fermenting and maturating step can not be expected to perform lactic acid fermentation after the concerned addition. Therefore, it is preferable to sufficiently perform lactic acid fermentation in the first stage fermenting and maturating step, to produce 0.5% (W/V) or more of lactic acid.

(Control of Second Stage Moromi)

In the second stage fermenting and maturating step, the second stage moromi may be controlled in accordance with a general method for controlling moromi, although the control is preferably carried out at a low temperature of 25° C. or less when HEMF is desired to be adjusted low.

In particular, it is further preferable if the control is carried out at 20° C. or less, since the generation of HEMF can be suppressed to approximately zero.

(Squeezing and Productization)

Thus matured moromi is press-filtered by a usual method. Then, the obtained clear liquid is pasteurized to obtain the brewed soy sauce with less soy sauce smell of the present invention.

EXAMPLE (Preparation of Soy Sauce Koji)

10 Kg of defatted soybeans (16.7 L in volume conversion as fresh soybeans) was added with 13 L of warm water at 80° C., which was heated and steam-boiled under pressure using a saturated water vapour at a steam pressure of 2 Kg/cm$^2$ (gauge pressure) for 20 minutes. The resultant product was mixed with roasted and milled wheat, which had been obtained by roasting 10 Kg of fresh wheat (13.3 L in volume conversion as fresh wheat) and subsequent milling. By so doing, a koji-making raw material having a moisture content of about 40% (W/W) was prepared. Next, this koji-making raw material was inoculated with a bran seed koji of *Aspergillus oryzae* (ATCC14895) (effective spore count: 1×10$^9$ spores/g) at 0.1% (W/W) (weight per thousand), which was then heaped in a container for using in the koji-making process by each test lot. The container was placed in a thermohygrostat koji-making chamber adjusted to 30° C., and was subjected to a usual koji-making control for 42 hours to obtain a soy sauce koji. The total volume of the contained soybeans and wheat (respectively converted as volumes of fresh soybeans and fresh wheat) was 1.0 L per 0.8 Kg of this soy sauce koji.

(First Stage Fermenting and Maturating Step)

Next, as shown in Table 1, ten lots respectively having 0.8 Kg of soy sauce koji were prepared and placed in an incubation tank. Each lot was added with a mixture of aqueous common salt solution and water so that the salt concentration of fermented and matured moromi would be 16.0% (W/V). That is to say, an aqueous common salt solution of the volume shown in Table 1 was mixed to the total volume of fresh soybeans and fresh wheat (in Table 1, this aqueous common salt solution is expressed as the ratio of water of first stage moromi % (V/V)). Next, a soy sauce lactic acid bacterium was added according to a usual method so that the initial concentration would be 1×10$^5$ cells/g of moromi. Then, the moromi was controlled while keeping the moromi temperature at 15° C., to effect raw material elution and lactic acid fermentation for about 1 month, to obtain a first stage moromi having component analytical values described in Table 1 (subject moromi of yeast addition).

Next, a salt tolerannt soy sauce yeast (*Zygosaccharomyces rouxii*) was added so that an initial cell count would be 5×10$^5$ cells/g of moromi. Then, aeration and agitation (aeration amount: 1.0 vvm) were performed for 10 days, while keeping the moromi temperature at 20° C., to obtain a first stage moromi having a yeast cell count, HEMF, and methionol respectively as described in Table 1.

(Addition of Additional Moromi)

As shown in Table. 2, this high-yeast containing first stage moromi was added with an aqueous common salt solution and a soy sauce koji produced in the same manner as used for the first stage moromi, to prepare an additional moromi. Then, the additional moromi was quickly added to each lot so that the total ratio of water would be 140% (V/V). The second stage moromi was prepared in this manner.

(Second Stage Fermenting and Maturating Step)

The second stage moromi was fermented and matured at a moromi temperature of 20 to 25° C. for 2 months.

(Press-Filtration and Component Analysis)

The fermented and matured second stage moromi was press-filtered by a usual method to obtain a final product (soy sauce) having the component analytical values described in Table 2.

For the purpose of comparison, in accordance with a usual process for producing an amino acid soy sauce (also referred to as a chemical soy sauce), defatted soybeans were hydrolyzed with hydrochloric acid to separate amino acid, which was then neutralized and filtered with sodium hydrogencarbonate (soda ash), followed by addition of salt to adjust the salt concentration at about 16% (W/V) to obtain an amino acid soy sauce. Thus obtained amino acid soy sauce was used as a comparative example of lot 11.

Moreover, comparative examples of lot 12 and lot 13 shown in Table 3 are examples of soy sauce produced by completing the fermentation and maturation of the first stage moromi without the addition of the additional moromi.

These moromi juice and amino acid soy sauce were subjected to a general component analysis, and the measurements of HEMF and methionol contents. In Tables 1, 2, and 3 described later, the component analysis of moromi juice was conducted in accordance with the method described in "Experimental Method for Soy Sauce" (edited by The Japan Soy Sauce Inspection Institute, issued on Mar. 1, 1985). Moreover, HEMF and methionol were analytically quantified by gas chromatography (refer to Journal of Agricultural and Food Chemistry Vol. 39, 934 (1991)). In the tables, HEMF and methionol values are expressed as conversions per 1.0% (W/V) of total nitrogen. The utilization rate of raw material was expressed as the ratio of the total solved nitrogen to the total nitrogen in the soy sauce raw material (defatted soybeans and wheat) by % (W/V).

From the results of Table 2, it is understood that the HEMF concentration remarkably decreased and the methionol concentration conversely increased by twice or three times in the brewed soy sauce of the present invention having a ratio of water of aqueous common salt solution at 170% to 450% (V/V) for the preparation of the first stage moromi (lots 5 to 9), as compared to the brewed soy sauce of the control example having a ratio of water of the aqueous common salt solution at 120% (V/V) which has been employed in conventional process for a brewed soy sauce (lot 3).

TABLE 1

Ratio of water of first stage moromi, general component analytical values of moromi, and flavor component analytical values of moromi after aeration

| Lot | Types of Present Invention/Comparative Example | Weight of soy sauce koji (Kg) | Total volume of soybeans and wheat (L) (A) | Volume of salt water (L) (B) | Ratio of water of first stage moromi % (V/V) (B/A) | Total nitrogen % (W/V) | Reducing sugar % (W/V) |
|---|---|---|---|---|---|---|---|
| 1 | Comparative Example | 0.8 | 1.0 | 0.65 | 65 | 2.7 | 10.0 |
| 2 | Comparative Example | 0.8 | 1.0 | 1.00 | 100 | 2.3 | 7.2 |
| 3 | Control Example | 0.8 | 1.0 | 1.20 | 120 | 2.0 | 6.0 |
| 4 | Comparative Example | 0.8 | 1.0 | 1.50 | 150 | 1.6 | 5.0 |
| 5 | Present Invention | 0.8 | 1.0 | 1.70 | 170 | 1.4 | 4.5 |
| 6 | Present Invention | 0.8 | 1.0 | 2.10 | 210 | 1.2 | 3.5 |
| 7 | Present Invention | 0.8 | 1.0 | 2.60 | 260 | 1.0 | 2.7 |
| 8 | Present Invention | 0.8 | 1.0 | 3.60 | 360 | 0.7 | 1.8 |
| 9 | Present Invention | 0.8 | 1.0 | 4.50 | 450 | 0.5 | 1.0 |
| 10 | Comparative Example | 0.8 | 1.0 | 6.00 | 600 | 0.3 | 0.6 |
| 11 | Comparative Example (amino acid soy sauce) | — | — | — | — | — | — |

| Lot | Total acid % (W/V) | pH | Salt % (W/V) | Maximum yeast cell count (cells/g of moromi) | HEMF concentration (ppm) | Methionol concentration (ppm) |
|---|---|---|---|---|---|---|
| 1 | 0.1 | 5.3 | 16.0 | $2 \times 10^6$ | 25.0 | 1.0 |
| 2 | 0.6 | 5.0 | 16.1 | $5 \times 10^6$ | 40.0 | 1.5 |
| 3 | 1.0 | 4.8 | 16.0 | $1 \times 10^7$ | 35.0 | 2.0 |
| 4 | 1.1 | 4.7 | 15.9 | $1 \times 10^7$ | 30.0 | 3.0 |
| 5 | 1.1 | 4.7 | 16.0 | $5 \times 10^7$ | 10.0 | 4.0 |
| 6 | 1.3 | 4.5 | 16.0 | $1 \times 10^8$ | 0.0 | 4.5 |
| 7 | 1.3 | 4.5 | 16.0 | $7 \times 10^7$ | 0.0 | 5.0 |
| 8 | 1.3 | 4.5 | 16.1 | $5 \times 10^7$ | 0.0 | 6.0 |
| 9 | 1.3 | 4.5 | 16.0 | $3 \times 10^7$ | 0.0 | 5.0 |
| 10 | 1.3 | 4.5 | 16.1 | $5 \times 10^6$ | 0.0 | 3.0 |
| 11 | — | — | — | — | 0.0 | 0.0 |

TABLE 2

Ratio of water of additional moromi, total ratio of water, and component analytical values of final products (soy sauce)

| Lot | Types of Present Invention/Comparative Example | Weight of soy sauce koji (Kg) | Total volume of soybeans and wheat (L) (A) | Volume of salt water (L) (B) | Ratio of water of first stage moromi % (V/V) (B/A) | Weight of soy sauce koji (Kg) | Total volume of soybeans and wheat (L) (E) | Volume of salt water (L) (F) | Ratio of water of additional moromi % (V/V) (F/E) | Total ratio of water % (V/V) (B + F)/(A + E) |
|---|---|---|---|---|---|---|---|---|---|---|
| 1 | Comparative Example | 0.8 | 1.0 | 0.65 | 65 | 1.6 | 2.0 | 3.6 | 180 | 140 |
| 2 | Comparative Example | 0.8 | 1.0 | 1.00 | 100 | 1.6 | 2.0 | 3.2 | 160 | 140 |

TABLE 2-continued

Ratio of water of additional moromi, total ratio of water, and component analytical values of final products (soy sauce)

| Lot | Name | | | | | | | | | |
|---|---|---|---|---|---|---|---|---|---|---|
| 3 | Control Example | 0.8 | 1.0 | 1.20 | 120 | 1.6 | 2.0 | 3.0 | 150 | 140 |
| 4 | Comparative Example | 0.8 | 1.0 | 1.50 | 150 | 1.6 | 2.0 | 2.7 | 135 | 140 |
| 5 | Present Invention | 0.8 | 1.0 | 1.70 | 170 | 1.6 | 2.0 | 2.5 | 125 | 140 |
| 6 | Present Invention | 0.8 | 1.0 | 2.10 | 210 | 1.6 | 2.0 | 2.1 | 105 | 140 |
| 7 | Present Invention | 0.8 | 1.0 | 2.60 | 260 | 1.6 | 2.0 | 1.6 | 80 | 140 |
| 8 | Present Invention | 0.8 | 1.0 | 3.60 | 360 | 1.6 | 2.0 | 0.6 | 30 | 140 |
| 9 | Present Invention | 0.8 | 1.0 | 4.50 | 450 | 2.4 | 3.0 | 1.1 | 37 | 140 |
| 10 | Comparative Example | 0.8 | 1.0 | 6.00 | 600 | 3.2 | 4.0 | 1.0 | 25 | 140 |
| 11 | Comparative Example (amino acid soy sauce) | — | — | — | — | — | — | — | — | — |

| | Item | | | | | | | | |
|---|---|---|---|---|---|---|---|---|---|
| | Utilization | | | Component analytical values of final products (soy sauce) | | | | | |
| Lot | rate of raw material % (W/V) | HEMF concentration (ppm) | Methionol concentration (ppm) | Total nitrogen % (W/V) | pH | Salt % (W/V) | Reducing sugar % (W/V) | Alcohol % (W/V) | Total acid % (W/V) | Color number |
| 1 | 80 | 30.0 | 1.7 | 1.7 | 5.4 | 16.4 | 3.2 | 2.0 | 0.1 | 29 |
| 2 | 83 | 35.0 | 1.5 | 1.7 | 5.3 | 16.2 | 3.0 | 2.2 | 0.2 | 31 |
| 3 | 85 | 30.0 | 1.6 | 1.8 | 5.3 | 15.8 | 2.9 | 3.0 | 0.4 | 30 |
| 4 | 84 | 25.0 | 1.9 | 1.7 | 5.2 | 15.9 | 2.5 | 2.7 | 0.4 | 32 |
| 5 | 85 | 15.0 | 2.5 | 1.8 | 5.1 | 15.7 | 1.0 | 3.2 | 0.5 | 35 |
| 6 | 85 | 0.0 | 3.2 | 1.8 | 5.1 | 15.7 | 1.0 | 3.4 | 0.6 | 36 |
| 7 | 86 | 0.0 | 3.5 | 1.8 | 5.1 | 15.6 | 1.2 | 3.3 | 0.6 | 37 |
| 8 | 78 | 0.0 | 4.2 | 1.6 | 5.2 | 16.4 | 1.4 | 3.1 | 0.5 | 37 |
| 9 | 74 | 0.0 | 2.0 | 1.6 | 5.3 | 16.4 | 1.6 | 3.2 | 0.4 | 36 |
| 10 | 62 | 28.0 | 1.5 | 1.4 | 5.4 | 16.4 | 3.0 | 3.0 | 0.2 | 32 |
| 11 | — | 0.0 | 0.0 | 1.6 | 4.8 | 16.2 | 3.0 | 3.0 | 0.8 | 22 |

(Preparation of Soy Sauce for Sensory Evaluation)

The total nitrogen and salt of the respective soy sauce obtained from the above were adjusted and standardized to the total nitrogen of 1.6% (W/V) and the salt of 16.2% (W/V), which are general standards of dark soy sauce. Then, pasteurisation was performed at 80° C. for 1 hour, to be used as products. Regarding lots 8 to 10, 12, and 13, which were difficult to adjust and standardize, the total nitrogen was adjusted to the adjustable maximum, and the salt concentration was uniformly adjusted at 16.2% (W/V).

(Sensory Evaluation of Soy Sauce)

The respective soy sauce products obtained from the above were subjected to the sensory evaluation for soy sauce-like feeling and savor. The sensory evaluation was performed by 20 panelists who had been trained to have the discrimination ability. The number of panelists who felt stronger soy sauce-like feeling against the control example (lot 3) (results) is shown. Moreover, the number of panelists who felt favorable savor (results) is shown.

The results of the sensory evaluation are shown in Table 3.

The meanings of respective reference symbols are as follows.

Reference symbol *: significant at the 5% level of significance. Reference symbol : significant at the 1% level of significance. Reference symbol *: significant at the 0.1% level of significance. No reference symbol: Not significant.

(Sensory Evaluation of Ramen Noodle Soup)

The respective soy sauce products obtained from the above were used to prepare ramen noodle soup with the following recipe.

| Recipe: | |
|---|---|
| extract concentration of pork bone broth (granule soup stock "Paitan soup (Chinese Baitang or bone broth)" manufactured by S&B Foods, Inc.) | 25 g |
| soy sauce | 50 ml |
| water | 1000 ml |

These ingredients were mixed and heated at 80° C. to be supplied to the test.

The above ramen noodle soup was subjected to the sensory evaluation for soy sauce-like feeling of soup, unpleasant smell from pork (reek of pork) of soup, and remaining aftertaste of soup.

The sensory evaluation was performed by 20 panelists who had been trained to have discrimination ability. The number of panelists who felt stronger soy sauce-like feeling of soup (results), the number of panelists who felt stronger unpleasant smell from pork (reek of pork) of soup (results), and number of panelists who felt stronger remaining aftertaste of soup against the control example (lot 3) (results) are shown.

The results of the sensory evaluation are shown in Table 3.

The meanings of respective reference symbols are as follows.

Reference symbol *: significant at the 5% level of significance. Reference symbol : significant at the 1% level of significance. Reference symbol *: significant at the 0.1% level of significance. No reference symbol: Not significant.

TABLE 3

Results of sensory evaluation

| Lot | Types of Present Invention/ Comparative Example | Preparation of first stage moromi | | | | Preparation of additional moromi | | | |
|---|---|---|---|---|---|---|---|---|---|
| | | Weight of soy sauce koji (Kg) | Total volume of soybeans and wheat (L) (A) | Volume of salt water (L) (B) | Ratio of water of first stage moromi % (V/V) (B/A) | Weight of soy sauce koji (Kg) | Total volume of soybeans and wheat (L) (E) | Volume of salt water (L) (F) | Ratio of water of additional moromi % (V/V) (F/E) |
| 1 | Comparative Example | 0.8 | 1.0 | 0.65 | 65 | 1.6 | 2.0 | 3.6 | 180 |
| 2 | Comparative Example | 0.8 | 1.0 | 1.00 | 100 | 1.6 | 2.0 | 3.2 | 160 |
| 3 | Control Example | 0.8 | 1.0 | 1.20 | 120 | 1.6 | 2.0 | 3.0 | 150 |
| 4 | Comparative Example | 0.8 | 1.0 | 1.50 | 150 | 1.6 | 2.0 | 2.7 | 135 |
| 5 | Present Invention | 0.8 | 1.0 | 1.70 | 170 | 1.6 | 2.0 | 2.5 | 125 |
| 6 | Present Invention | 0.8 | 1.0 | 2.10 | 210 | 1.6 | 2.0 | 2.1 | 105 |
| 7 | Present Invention | 0.8 | 1.0 | 2.60 | 260 | 1.6 | 2.0 | 1.6 | 80 |
| 8 | Present Invention | 0.8 | 1.0 | 3.60 | 360 | 1.6 | 2.0 | 0.6 | 30 |
| 9 | Present Invention | 0.8 | 1.0 | 4.50 | 450 | 2.4 | 3.0 | 1.1 | 37 |
| 10 | Comparative Example | 0.8 | 1.0 | 6.00 | 600 | 3.2 | 4.0 | 1.0 | 25 |
| 11 | Comparative Example (amino acid soy sauce) | — | — | — | — | — | — | — | — |
| 12 | Comparative Example (first stage moromi 1) | 0.8 | 1.0 | 1.70 | 170 | — | — | — | — |
| 13 | Comparative Example (first stage moromi 2) | 0.8 | 1.0 | 2.10 | 210 | — | — | — | — |

| Lot | Total ratio of water % (V/V) (B + F)/ (A + E) | Component analytical values of soy sauce stock solution | | Sensory evaluation | | | | |
|---|---|---|---|---|---|---|---|---|
| | | | | Soy sauce stock solution | | Ramen noodle soup | | |
| | | HEMF concentration (ppm) | Methionol concentration (ppm) | soy sauce-like feeling | savor | Soy sauce-like feeling | unpleasant smell from pork (reek of pork) | Remaining aftertaste |
| 1 | 140 | 30.0 | 1.7 | 10 | 13 | 11 | 12 | 13 |
| 2 | 140 | 35.0 | 1.5 | 13 | 10 | 13 | 9 | 11 |
| 3 | 140 | 30.0 | 1.6 | — | — | — | — | — |
| 4 | 140 | 25.0 | 1.9 | 8 | 9 | 7 | 11 | 13 |
| 5 | 140 | 15.0 | 2.5 | 3** | 11 | 3** | 12 | 17** |
| 6 | 140 | 0.0 | 3.2 | 1*** | 12 | 1*** | 13 | 19*** |
| 7 | 140 | 0.0 | 3.5 | 0*** | 11 | 1*** | 12 | 19*** |
| 8 | 140 | 0.0 | 4.2 | 0*** | 12 | 2*** | 11 | 17** |
| 9 | 140 | 0.0 | 2.0 | 0*** | 13 | 2*** | 11 | 15* |
| 10 | 140 | 28.0 | 1.5 | 7 | 4* | 8 | 13 | 9 |
| 11 | — | 0.0 | 0.0 | 4* | 3** | 3** | 18*** | 1*** |
| 12 | 170 | 10.0 | 4.0 | 2*** | 3** | 2*** | 19*** | 7 |
| 13 | 210 | 0.0 | 4.5 | 0*** | 2*** | 0*** | 20*** | 4* |

From the results of Table 3, it is understood that the soy sauce-like feeling remarkably decreased in the soy sauce of the present invention as compared to the control example (lot 3). Moreover, the soy sauce of the present invention was comparative to the control example (lot 3) in terms of savor, and was found to have a rich savor. Further, the ramen noodle soup using the soy sauce of the present invention was found to have almost no soy sauce-like feeling but have a strong remaining aftertaste while masking the unpleasant smell from pork (reek of pork). That is to say, it is found to be possible to obtain a soy sauce with very little soy sauce smell and having a rich savor with a deep taste using the same raw materials at the same volume without sacrificing the utilization rate of these raw materials, as compared to a conventional brewing process of a soy sauce. On the other hand, regarding the amino acid soy sauce of the comparative example (lot 11) and the soy sauces obtained from the first stage moromi of the comparative examples (lots 12 and 13), the soy sauce-like feeling was weak in both the soy sauce stock solution and the ramen noodle soup, however the savor was inferior in the soy sauce stock solution, and the reek of blood was obtrusive in the ramen noodle soup, as compared to the control example (lot 3). Moreover, regarding the remaining aftertaste in the ramen noodle soup, lots 11, 12, and 13 were comparative or inferior to the control example (lot 3), showing that they are far from having the remaining aftertaste of the soy sauce of the present invention.

All publications, patents, and patent applications cited herein are incorporated herein by reference in their entirety.

The invention claimed is:

1. A process for producing a brewed soy sauce, comprising:
preparing a soy sauce koji;
preparing a soy sauce moromi by adding an aqueous common salt solution to said soy sauce koji at a volume ratio of 170% to 450% (v/v) to the volume of plant seeds (converted as the bulk volume of fresh seeds) used for the preparation of said soy sauce koji;
fermenting and maturing said soy sauce moromi, wherein this step comprises lactic acid fermentation and yeast fermentation;
adding either a soy sauce koji alone or a combination of a soy sauce koji and an aqueous common salt solution to said first stage soy sauce moromi during the fermentation and maturation to prepare a second stage soy sauce moromi; and
further fermenting and maturing said second stage soy sauce moromi, wherein this step comprises lactic acid fermentation and yeast fermentation.

2. A brewed soy sauce produced by the process according to claim 1 that
contains 15.0 ppm or less of 4-hydroxy-2(or 5)ethyl-5(or 2)methyl-3(2H)furanone ("HEMF") per 1.0% (w/v) of total nitrogen and
contains 2.0 ppm or more of methionol per 1.0% (w/v) of total nitrogen.

3. The process of claim 1, further comprising adding an aqueous sodium chloride solution to the soy sauce koji to adjust the sodium chloride concentration in the first and second stage moromi to a value within the range 13.0% (w/v) to 20.0% (w/v).

4. The process of claim 1, wherein additional soy sauce koji or a mixture of soy sauce koji and an aqueous salt solution is added to the first stage moromi when the titer of viable yeast cells reaches $3 \times 10^7$ cells/g of first stage moromi.

5. The process of claim 1, wherein the second stage moromi is fermented with lactic acid bacteria and yeast transferred from the preparation of the first stage moromi without the addition of new lactic acid bacteria or yeast.

6. The process of claim 1, wherein the first stage moromi is fermented until its lactic acid content is 0.5% (w/v) or more.

* * * * *